UNITED STATES PATENT OFFICE.

AXEL HETHEY, OF LONDON, ENGLAND.

REFINING STEEL.

1,089,410. Specification of Letters Patent. Patented Mar. 10, 1914.

No Drawing. Application filed July 21, 1913. Serial No. 780,373.

*To all whom it may concern:*

Be it known that I, AXEL HETHEY, a subject of the King of England, residing in London, England, have invented certain new and useful Improvements in Refining Steel, of which the following is a specification.

In the making or refining of steel in the electric furnace or open hearth it is the custom to oxidize the metal in order to reduce the carbon content and to remove various impurities, the chief of which is phosphorus; a slag containing oxid of iron, silica and lime being used. When the slag is in proper condition, it is removed. As a certain amount of oxid of iron remains dissolved in the metal, reducing materials are added to the bath to deoxidize it and a new slag is charged, this slag being composed of lime, sand and fluorspar. When said slag is melted, coke dust is thrown on it to reduce the oxids present in the slag. At the high temperature of the arc calcium carbid ($CaC_2$) is made from lime and carbon and this calcium carbid acts as a deoxidizer for the steel. In some cases the deoxidation is done with ferro-silicon, in which case there is danger of having silica ($SiO_2$) in the bath, which makes the steel brittle and the ingots crack during the rolling. The silica being solid at rolling temperatures, the presence of silica in steel is worse than that of oxid of iron.

If the deoxidation is done with the calcium carbid formed in the slag, it is found that the process is slow and often not reliable with furnaces having a bath of over ten inches deep, as the calcium carbid does not dissolve in steel and lies near the upper surface of the slag,—hence the slag and bath have to be stirred frequently, which causes an increase of carbon in the steel. It is impossible to control this and this practice cannot, therefore, be used in the making of low carbon steel of say under 0.30 per cent. carbon.

I have discovered a process by which low carbon steel can be made and thoroughly deoxidized, without producing any silica in the metal and without the difficulties heretofore found in using the calcium carbid slag and also with an important saving of time. According to one feature of this process I provide a certain quantity of manganese in the metal during the melting operations. I have discovered that this manganese will protect the metal, preventing the solution or formation of iron oxid therein, but will not protect the phosphorus against oxidation and will assist in reducing the content of sulfur. The manganese will also assist in removing oxygen contained originally in the steel. According to another feature of the process (which is applicable not only in the electric furnace, but in other vessels) I prevent the iron oxid from passing from the slag into the metal by adding lime or dolomite, or a mixture of these two to bring the slag to a practically solid state.

An example of my process is as follows: The charge is made up in an electric furnace of scrap and contains from 0.25 per cent. to 1 per cent. of manganese. Cold scrap may be charged in this way. Or molten metal may be charged and the desired percentage of manganese incorporated therein either before or after charging. A slag of lime and iron oxid is added proportioned to oxidize the phosphorus out of the metal and into the slag as phosphate of lime, and to oxidize out a part of the carbon if desired. Sulfur is also removed from the metal, being first converted into a double sulfid of iron and manganese in the bath and then collected by the slag. The extraction of phosphorus, notwithstanding the presence of manganese, is shown by the following analyses of four heats. The metal contained, when poured in the electric furnace, sulfur 0.04 per cent.; phosphorus 0.10 per cent.; and carbon and manganese in various percentages. The tests are from four different heats and were taken from thirty to forty minutes after the heats were started.

|  | C. | S. | P. | Mn. |
|---|---|---|---|---|
| Heat No. 1 | .32 | .026 | .017 | .27 |
| " " 2 | .21 | .026 | .020 | .54 |
| " " 3 | .33 | .024 | .020 | .59 |
| " " 4 | .14 | .017 | .017 | .98 |

The test metal forged under a steam hammer showed in each case a perfectly clean edge without cracks, a proof of the absence of iron oxid and silica. During the process additions of ferro-manganese are made from time to time to maintain a minimum of 0.25 per cent. in the steel and as much above this minimum (at the end of the process) as the specification may call for. A rough test for Mn is the appearance of cracks on the edges of a forged test piece, which appearance indicates a Mn content of about 0.25 per cent. or less.

If high carbon steel is to be made the slag is poured off partly or wholly after dephosphorization and coke or anthracite coal thrown on the bath, thus producing a quick carburization. Or if liquid pig iron is available for carburizing it may be poured through the slag without necessity of removing the latter. After carburization a finishing slag of lime, sand and fluorspar is added to cover the bath and a small quantity of coke dust to prevent oxidation of the slag by air entering through the doors. Or, according to the second feature of my invention, the original slag with its included sulfur and phosphorus may be left in the furnace and, in order to prevent any further solution of oxid of iron in the steel I add lime or dolomite or a mixture of them. The lime is added in quantity sufficient to make the slag solid. This converts it from an active oxidizing slag to one which is passive and will not oxidize the metal. Such a solid slag permits of a desirable increase of temperature in the final stage of the process to render the metal more fluid for pouring, without causing the passage of oxids back into the metal (the increased temperature having a natural tendency to cause such passage of oxids into the metal).

Where ferro-silicon containing above 25 per cent. silicon is to be added, the addition must be made in the ladle, such ferro-silicon being too light to sink through the slag in the furnace.

The product is well deoxidized, can be made of as low carbon content as desired, and contains the percentage of manganese usually desired to make the metal easy to work, so that there is no necessity of making the usual additions of manganese at the end of the process.

What I claim is:—

1. In the refining of phosphoric steel in the open hearth or electric furnace, the process which consists in dephosphorizing the steel with an oxidizing slag and adding manganese to the metal from time to time during such dephosphorization to protect the metal from solution or formation of iron oxid therein.

2. The process of refining steel which consists in treating it with an oxidizing slag and maintaining manganese in the metal during such treatment and thereafter bringing the slag to a solid condition by the addition of lime or dolomite to prevent action of the oxid in the slag upon the metal.

3. The process of producing low carbon steel in the electric furnace which consists in treating it with an oxidizing slag and maintaining manganese in the metal during such treatment, continuing such operations until the desired oxidization of impurities is secured, and thereafter adding lime or dolomite to the slag to prevent action of the oxid in the slag upon the metal and finishing the process at an increased temperature with this solid slag.

4. In the treatment of steel with a slag containing an oxid which tends to act on the metal, the method of preventing such action which consists in solidifying the slag by the addition of lime or dolomite thereto.

In witness whereof, I have hereunto signed my name in the presence of two subscribing witnesses.

AXEL HETHEY.

Witnesses:
D. ANTHONY USINA,
LULU STUBENVOLL.